United States Patent
Iwami et al.

(10) Patent No.: US 7,088,690 B2
(45) Date of Patent: Aug. 8, 2006

(54) RADIO BASE STATION SYSTEM PERMITTING PATH DIVISION MULTIPLE CONNECTION, AND SYNCHRONIZATION WINDOW CONTROL METHOD AND SYNCHRONIZATION WINDOW CONTROL PROGRAM THEREFOR

(75) Inventors: Masashi Iwami, Gifu (JP); Takeo Miyata, Gifu (JP); Yoshiharu Doi, Gifu (JP)

(73) Assignee: Sanyo Electric Co., LTD, Moriguchi (JP)

( * ) Notice: Subject to any disclaimer, the term of this patent is extended or adjusted under 35 U.S.C. 154(b) by 838 days.

(21) Appl. No.: 09/941,700

(22) Filed: Aug. 30, 2001

(65) Prior Publication Data

US 2002/0028689 A1    Mar. 7, 2002

(30) Foreign Application Priority Data

Sep. 1, 2000    (JP)    ............................. 2000-265236

(51) Int. Cl.
*H04Q 7/00* (2006.01)
*H04B 3/00* (2006.01)
*H04B 7/212* (2006.01)
*H04B 17/00* (2006.01)

(52) U.S. Cl. ...................... 370/310; 370/337; 370/347; 370/350

(58) Field of Classification Search ...................... None
See application file for complete search history.

(56) References Cited

U.S. PATENT DOCUMENTS

| | | | | |
|---|---|---|---|---|
| 4,686,673 A | * | 8/1987 | Hotta | 370/324 |
| 5,487,174 A | * | 1/1996 | Persson | 455/444 |
| 5,719,859 A | * | 2/1998 | Kobayashi et al. | 370/347 |
| 6,061,553 A | * | 5/2000 | Matsuoka et al. | 455/273 |
| 6,347,096 B1 | * | 2/2002 | Profumo et al. | 370/476 |

FOREIGN PATENT DOCUMENTS

| | | | | |
|---|---|---|---|---|
| JP | 5-252128 | | 9/1993 | |
| JP | 11-55208 | | 2/1999 | |
| JP | 11-163818 A | * | 6/1999 | |
| JP | 2000-49737 | | 2/2000 | |
| JP | 2001-274741 | | 10/2001 | |
| JP | 2001-285188 | | 10/2001 | |
| JP | 2001-285931 | | 10/2001 | |

* cited by examiner

*Primary Examiner*—Chau Nguyen
*Assistant Examiner*—Cynthia L. Davis
(74) *Attorney, Agent, or Firm*—Westerman, Hattori, Daniels & Adrian, LLP.

(57)    ABSTRACT

For each of a plurality of users having multiple connection to a specific time slot a synchronization window of a predetermined temporal length having a center corresponding to a synchronization position is set to disallow a subsequent signal reception outside the widow. Furthermore timings of transmission for users are controlled to prevent synchronization windows from overlapping or being too distant from each other in the time slot. Thus, synchronization positions can be prevented from approaching each other or having an inverted time relationship therebetween. This process is provided by a DSP in software.

30 Claims, 8 Drawing Sheets

RADIO BASE STATION SYSTEM PERMITTING PATH DIVISION MULTIPLE CONNECTION, AND SYNCHRONIZATION WINDOW CONTROL METHOD AND SYNCHRONIZATION WINDOW CONTROL PROGRAM THEREFOR

BACKGROUND OF THE INVENTION

1. Field of the Invention

The present invention relates generally to radio base station systems, synchronization window control methods and synchronization window control programs, and particularly to a radio base station system permitting path division multiple connection of a plurality of mobile terminal devices in a mobile communication system, and a synchronization window control method and a synchronization window control program for providing an appropriate timing of signal reception (a synchronization position) in such a radio base station system.

2. Description of the Background Art

In recent years, in rapidly developing mobile communication systems (for example the personal handy phone system (PHS)) a path division multiple access (PDMA) system has been proposed to enhance radio wave frequency utilization efficiency. In this system, a single time slot of a single frequency can spatially be divided to allow path division multiple connection of mobile terminal devices of a plurality of users to a radio base station system. In the system, a signal from each user's mobile terminal device is separated and extracted by a well-known adaptive array process.

In a mobile communication system according to such a PDMA system, a reception timing at which a signal transmitted from each mobile terminal device arrives at a radio base station (hereinafter also referred to as a "synchronization position") varies for a variety of factors, such as a variation of the distance between the terminal device and the base station due to the movement of the terminal device, radio wave propagation characteristics variation, and the like.

In a mobile communication system of the PDMA system, when mobile terminal devices of a plurality of user are permitted to have path division multiple connection to a single time slot, the synchronization positions of signals received from mobile terminal devices, respectively, may vary for the aforementioned reasons and thus approach to each other or in some case have an inverted time relationship therebetween.

If synchronization positions approach each other too close, signals received from a plurality of mobile terminal devices would have a high temporal correlation. This results in low precision extraction of a signal for each user by the adaptive array process and consequently impaired speech characteristics for each user.

Furthermore in the PHS a signal received from each mobile terminal device includes a reference signal section for each frame. The reference signal section is formed of a known bit train shared by all users. If the synchronization positions of signals from the mobile terminal devices of multiple users match, the received signals would have their respective reference signal sections overlapping and the users cannot be identified or separated from each other, and inter-user interference (so-called "swap") would be introduced.

SUMMARY OF THE INVENTION

Therefore the present invention contemplates a radio base station system, a synchronization window control method and a synchronization window control program capable of suppressing degradation of speech characteristics of mobile terminal devices of multiple users having path division multiple connection to a single time slot, and interference between such users.

In the present invention, a radio base station system permitting path division multiple connection of a plurality of mobile terminal devices, includes a synchronization window setting unit, a reception disallowing unit and a transmission timing control unit. The synchronization window setting unit sets a synchronization window having a predetermined temporal length with a center positioned at a timing of reception of a signal transmitted from each mobile terminal device. The reception disallowing unit disallows subsequent reception of the signal if a timing of said subsequent reception of said signals is external to the set synchronization window. The transmission timing control unit controls timings of signal transmission for respective ones of the plurality of mobile terminal devices having path division multiple connection to a specific time slot, to allow the plurality of mobile terminal devices to have their respective synchronization windows spaced from each other, as appropriate, within the specific time slot.

Preferably the transmission timing control unit includes: a first control unit controlling the timings of signal transmission to increase a difference in time between the timings of signal transmission for respective ones of the plurality of mobile terminal devices having the path division multiple connection, when the plurality of mobile terminal devices have their respective synchronization windows with a reduced interval therebetween; and a second control unit controlling the timings of signal transmission to decrease a difference in time between the timings of signal transmission for respective ones of the plurality of mobile terminal devices having the path division multiple connection, when the plurality of mobile terminal devices have their respective synchronization windows with an increased interval therebetween.

More preferably the transmission timing control unit includes a third control unit at least partially canceling the path division multiple connection to the specific time slot when at least two the mobile terminal devices having the path division multiple connection have their respective synchronization windows overlapping, after the transmission timing control unit controls the timings of transmission.

More preferably the third control unit includes a first connection unit connecting to a different time slot of the radio base station system any of the plurality of mobile terminal devices having the path division multiple connection.

More preferably the third control unit includes a second connection unit connecting to a time slot of a different radio base station system any of the plurality of mobile terminal devices having the path division multiple connection.

More preferably the transmission timing control unit includes a fourth control unit excluding from the synchronization window of each of at least two the mobile terminal devices having the path division multiple connection an overlap of the at least two synchronization windows when the at least two mobile terminal devices have their respective synchronization windows overlapping, after the transmission timing control unit controls the timings of transmission.

More preferably the radio base station system further includes a synchronization window width control unit controlling widths of the synchronization windows of respective ones of the plurality of mobile terminal devices having the path division multiple connection to the specific time slot, to allow synchronization windows to be spaced from each other, as appropriate, within the specific time slot.

More preferably the synchronization window width control unit includes a fifth control unit reducing a width of the synchronization window of the mobile terminal device transmitting a signal received at a timing constant over a predetermined period of time.

More preferably the synchronization window control unit includes a sixth control unit increasing a width of the synchronization window when a reception error is introduced with the mobile terminal device having the width of the synchronization window reduced.

More preferably the synchronization window width control unit includes a seventh control unit reducing widths of the synchronization windows of respective ones of the mobile terminal devices having the path division multiple connection to the specific time slot, if a number of the mobile terminal devices having the path division multiple connection to the specific time slot is increased.

The present invention in another aspect provides a method of controlling a synchronization window in a radio base station system permitting path division multiple connection of a plurality of mobile terminal devices, including the steps of: setting a synchronization window having a predetermined temporal length with a center positioned at a timing of reception of a signal transmitted from each mobile terminal device; disallowing subsequent reception of the signal if a timing of said subsequent reception of said signal is external to the set synchronization window; and controlling timings of signal transmission for respective ones of the plurality of mobile terminal devices having path division multiple connection to a specific time slot, to allow the plurality of mobile terminal devices to have their respective synchronization windows spaced from each other, as appropriate, within the specific time slot.

Preferably the step of controlling includes the steps of: controlling the timings of signal transmission to increase a difference in time between the timings of signal transmission for respective ones of the plurality of mobile terminal devices having the path division multiple connection, when the plurality of mobile terminal devices have their respective synchronization windows with a reduced interval therebetween; and controlling the timings of signal transmission to decrease a difference in time between the timings of signal transmission for respective ones of the plurality of mobile terminal devices having the path division multiple connection, when the plurality of mobile terminal devices have their respective synchronization windows with an increased interval therebetween.

More preferably the step of controlling includes the step of at least partially canceling the path division multiple connection to the specific time slot when at least two the mobile terminal devices having the path division multiple connection have their respective synchronization windows overlapping, after the step of controlling the timings of transmission.

More preferably the step of canceling the path division multiple connection includes the step of connecting to a different time slot of the radio base station system any of the plurality of mobile terminal devices having the path division multiple connection More preferably the step of canceling the path division multiple connection includes the step of connecting to a time slot of a different radio base station system any of the plurality of mobile terminal devices having the path division multiple connection.

More preferably the step of controlling includes the step of excluding from the synchronization window of each of at least two the mobile terminal devices having the path division multiple connection an overlap of the at least two synchronization windows when said at least two mobile terminal devices have their respective synchronization windows overlapping, after the step of controlling the timings of transmission.

More preferably the method further includes the step of controlling widths of the synchronization windows of respective ones of the plurality of mobile terminal devices having the path division multiple connection to the specific time slot, to allow synchronization windows to be spaced from each other, as appropriate, within the specific time slot.

More preferably the step of controlling the widths includes the step of reducing a width of the synchronization window of the mobile terminal device transmitting a signal received at a timing constant over a predetermined period of time.

More preferably the step of controlling the widths includes the step of increasing a width of the synchronization window when a reception error is introduced with the mobile terminal device having the width of the synchronization window reduced.

More preferably the step of controlling the widths includes the step of reducing widths of the synchronization windows of respective ones of the mobile terminal devices having the path division multiple connection to the specific time slot, if a number of the mobile terminal devices having the path division multiple connection to the specific time slot is increased.

The present invention in still another aspect provides a program used to control a synchronization window in a radio base station system permitting path division multiple connection of a plurality of mobile terminal devices, the program causing a computer to execute the steps of: setting a synchronization window having a predetermined temporal length with a center positioned at a timing of reception of a signal transmitted from each mobile terminal device; disallowing subsequent reception of the signal if a timing of said subsequent reception of said signal is external to the set synchronization window; and controlling timings of signal transmission for respective ones of the plurality of mobile terminal devices having path division multiple connection to a specific time slot, to allow the plurality of mobile terminal devices to have their respective synchronization windows spaced from each other, as appropriate, within the specific time slot.

Preferably the step of controlling includes the steps of: controlling the timings of signal transmission to increase a difference in time between the timings of signal transmission for respective ones of the plurality of mobile terminal devices having the path division multiple connection, when the plurality of mobile terminal devices have their respective synchronization windows with a reduced interval therebetween; and controlling the timings of signal transmission to decrease a difference in time between the timings of signal transmission for respective ones of the plurality of mobile terminal devices having the path division multiple connection, when the plurality of mobile terminal devices have their respective synchronization windows with an increased interval therebetween.

More preferably the step of controlling includes the step of at least partially canceling the path division multiple connection to the specific time slot when at least two the mobile terminal devices having the path division multiple connection have their respective synchronization windows overlapping, after the step of controlling the timings of transmission.

More preferably the step of canceling the path division multiple connection includes the step of connecting to a different time slot of the radio base station system any of the plurality of mobile terminal devices having the path division multiple connection.

More preferably the step of canceling the path division multiple connection includes the step of connecting to a time slot of a different radio base station system any of the plurality of mobile terminal devices having the path division multiple connection.

More preferably the step of controlling includes the step of excluding from the synchronization window of each of at least two the mobile terminal devices having the path division multiple connection an overlap of the at least two synchronization windows when said at least two mobile terminal devices have their respective synchronization windows overlapping, after the step of controlling the timings of transmission.

More preferably the program further causes the computer to execute the step of controlling widths of the synchronization windows of respective ones of the plurality of mobile terminal devices having the path division multiple connection to the specific time slot, to allow synchronization windows to be spaced from each other, as appropriate, within the specific time slot.

More preferably the step of controlling the widths includes the step of reducing a width of the synchronization window of the mobile terminal device transmitting a signal received at a timing constant over a predetermined period of time.

More preferably the step of controlling the widths includes the step of increasing a width of the synchronization window when a reception error is introduced with the mobile terminal device having the width of the synchronization window reduced.

More preferably the step of controlling the widths includes the step of reducing widths of the synchronization windows of respective ones of the mobile terminal devices having the path division multiple connection to the specific time slot, if a number of the mobile terminal devices having the path division multiple connection to the specific time slot is increased.

Thus in the present invention a synchronization window can be set with its center positioned at a timing of reception (a synchronization position) of a signal from each user's mobile terminal device at a base station to eliminate a signal received outside the synchronization window and in a single slot multiple users can have their respective synchronization windows having therebetween an interval maintained as appropriate by controlling the timings of signal transmission for the multiple users to prevent the users from having their respective synchronization positions approaching each other or having an inverted time relationship therebetween and thus prevent impaired speech characteristics and inter-user interference.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
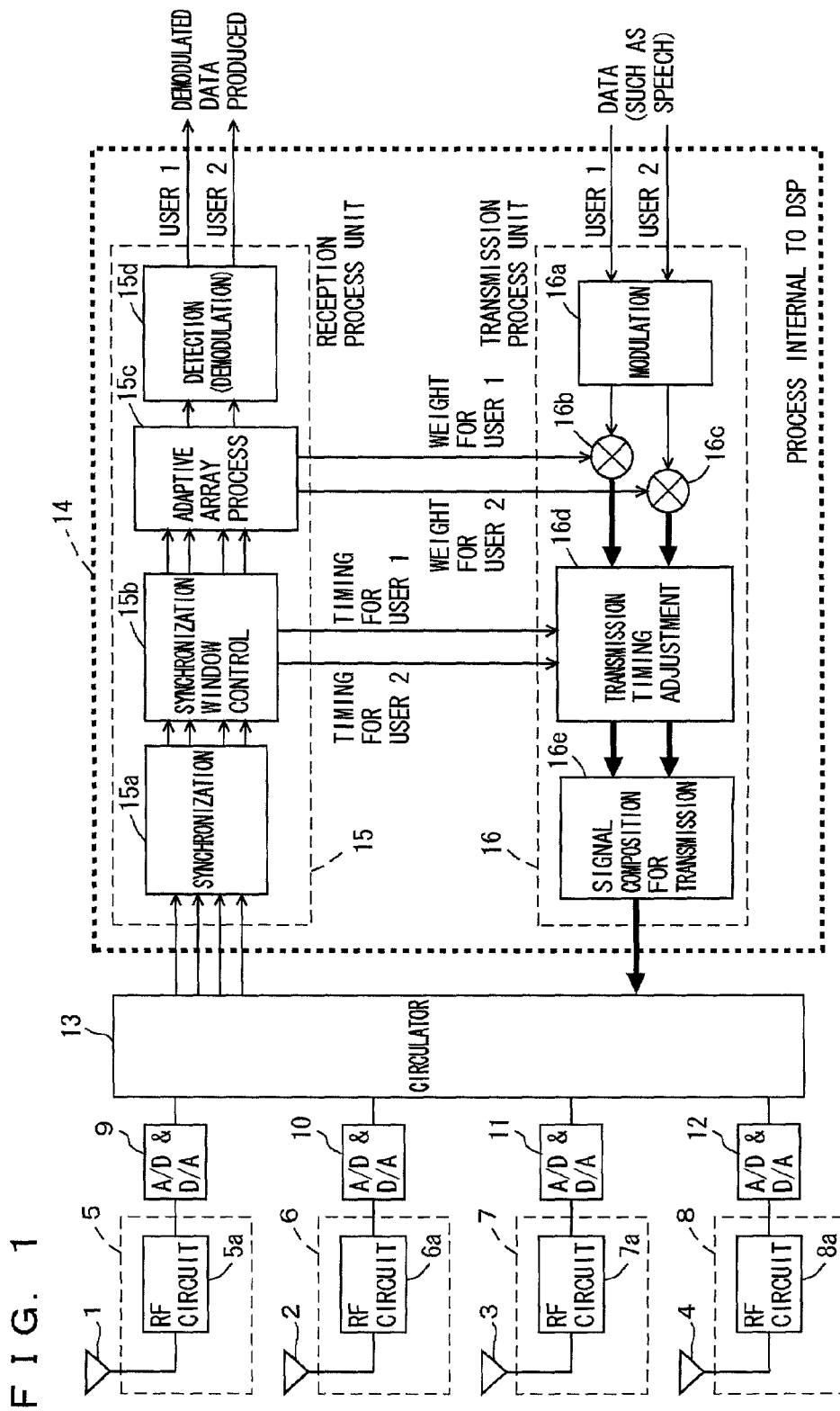
FIG. 1 is a functional block diagram showing a whole configuration of a radio base station system in the present invention.

Hereinafter the embodiments of the present invention will be described more specifically with reference to the drawings. In the figures, like components are denoted by like reference characters.

FIG. 1 is a functional block diagram showing a whole configuration of a radio base station system of the present invention.

With reference to FIG. 1, the radio base station system has a plurality of antennas, herein exemplarily four antennas 1, 2, 3, 4 receiving signals from the mobile terminal devices of multiple users. The received signals are subjected to a reception process in the corresponding transmission and reception circuits 5, 6, 7, 8 at their respective RF circuits 5a, 6a, 7a, 8a and furthermore they are converted by A/D and D/A converters 9, 10, 11, 12 into digital signals.

The signals of the four routes that are received from the antennas, respectively, and digitally converted are fed via a circulator 13 to a digital signal processor (DSP) 14. A broken line 14 surrounds an interior of the DSP that corresponds to processes executed by the DSP in software, shown in the form of a functional block diagram.

The received signals of the four routes that are fed via circulator 13 to DSP 14 are fed to a reception process unit 15 and received by a synchronization process unit 15a employing a well-known synchronization position estimation method to estimate with high precision synchronization positions of signals received from respective multiple users (users 1 and 2 in this example) having path division multiple connection to the radio base station system.

A synchronization window control unit 15b sets a synchronization window based on a synchronization position estimated for each user and controls the synchronization window in accordance with the present invention, as will be described hereinafter in detail.

Then an adaptive array process unit 15c applies a well-known adaptive array process to the received signals and calculated weights for users 1 and 2 are used to separate and extract signals received from users 1 and 2.

The separated and extracted signals for respective user are demodulated by a detection unit 15d and output from DSP 14 as demodulated data of users 1 and 2.

In contrast, data to be transmitted for users 1 and 2 (e.g., speech data) are fed to DSP 14 and received by transmission process unit 16 at a modulation process unit 16a. Modulation process unit 16a modulates and thus feeds the data of users 1 and 2 to one inputs of multipliers 16b and 16c, respectively.

Multipliers 16b and 16c have their respective other inputs receiving the weights for users 1 and 2, respectively, calculated by adaptive array process unit 15c, to determine transmission directivity of the data of users 1 and 2.

Multipliers 16b and 16c have their respective outputs input to a transmission timing adjustment process unit 16d adjusting timings of data transmission for users 1 and 2 in response to signals controlling timings of transmission for users 1 and 2 that are received from synchronization window control unit 15b, as will be described hereinafter.

A signal composition process unit 16e composites signals of users 1 and 2 for transmission and converts the same to signals of four routes for transmission, as indicated in FIG. 1 by a single arrow, which are distributed via circulator 13 to A/D and D/A converters 9, 10, 11, 12 which in turn convert the same to analog signals which are in turn output to their respective transmission and reception circuits 5, 6, 7, 8 and subjected to a transmission process in their respective RF circuits 5a, 6a, 7a, 8a and thus transmitted via their corresponding antennas 1, 2, 3, 4 to mobile terminal device.

Figure 2:
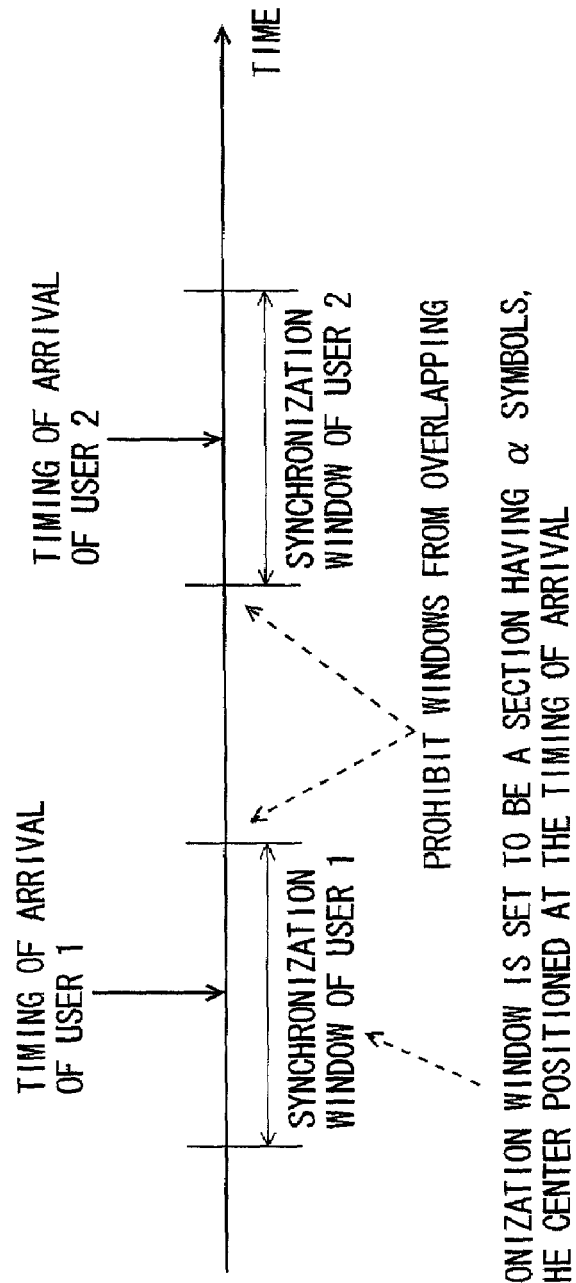
FIG. 2 is a timing diagram for schematically illustrating the principle of a synchronization window control method of the present invention.
Figure 3:
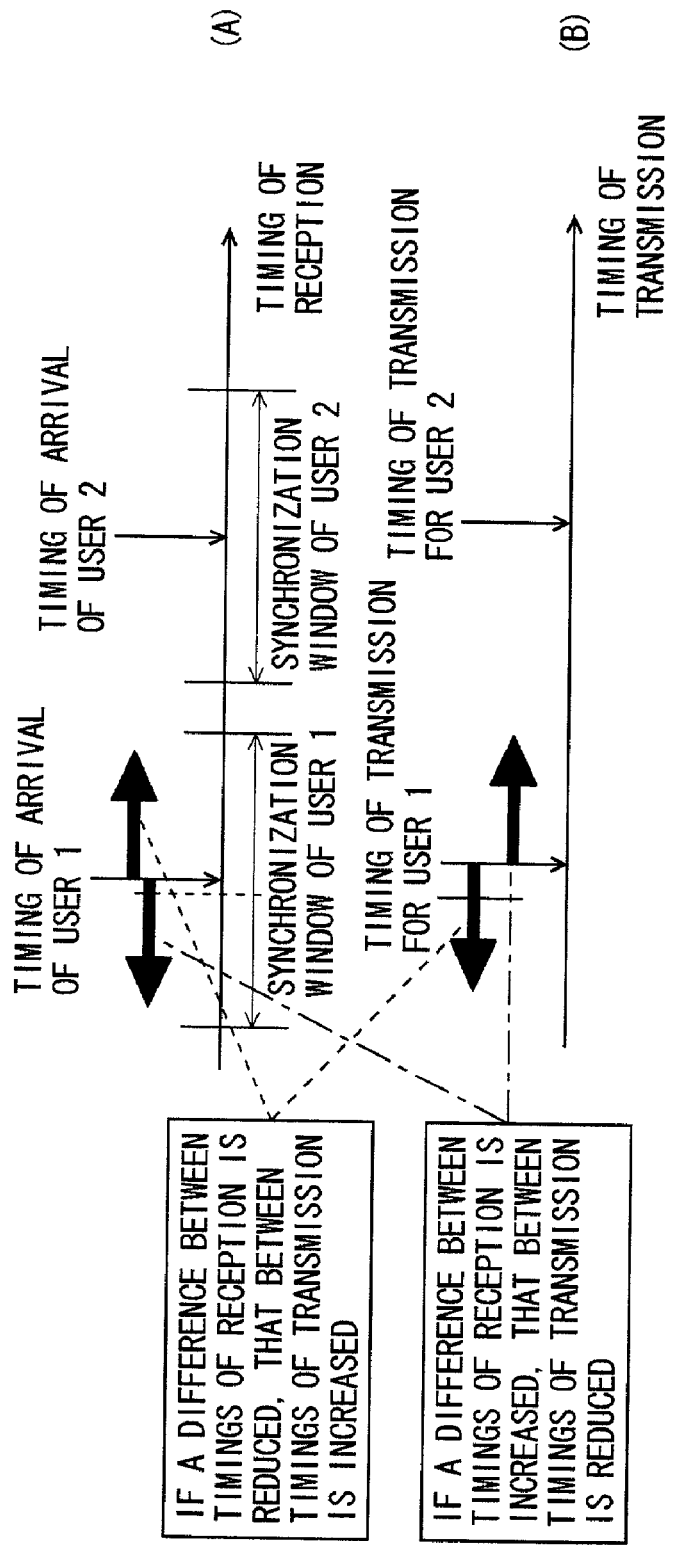
FIG. 3 is a timing diagram for schematically illustrating the principle of a synchronization window control method of the present invention.

Reference will now be made to FIGS. 2 and 3 to describe the principle of a method controlling a synchronization window in a radio base station system in accordance with the present invention.

FIG. 2 is a timing diagram in a single time slot, illustrating timings of arrival of signals received from users 1 and 2, i.e., synchronization positions, in the time slot.

In accordance with the present invention, a section formed of α symbols is set as a synchronization window having a center corresponding to a timing of arrival of each user or a synchronization position. If a subsequent timing of signal reception does not fall within the synchronization window, it is not accepted as a synchronization position, i.e., the signal reception is disallowed.

In general, a timing of signal reception can vary from time to time as the mobile terminal device moves, although a timing does not jump to a significantly different timing and a signal reception at such a timing would be attributed to an error and should desirably be disallowed.

Accordingly in the present invention, as shown in FIG. 2, with the fact considered that the synchronization position for each user more or less varies for each frame and also can be estimated inaccurately, a synchronization window of a predetermined temporal length is provided with its center positioned at a synchronization position estimated in the frame, and at a subsequent timing of reception or in a subsequent signal reception frame only the range of the set synchronization window is regarded as a synchronization position and any other timing is not recognized as a synchronization position and any reception at such a timing is disallowed.

As shown in FIG. 2, if multiple users 1 and 2 have path division multiple connection to a single time slot, two synchronization positions exist and correspondingly two synchronization windows exist. As has been described in the Description of Background Art, if multiple user have their respective synchronization positions approaching each other or having an inverted time relationship therebetween, speech characteristics are impaired or interference is introduced.

Accordingly in the present invention a synchronization window is controlled to prohibit multiple users from having their synchronization windows overlapping and thus prevent their synchronization positions from approaching each other or having an inverted time relationship therebetween.

With reference to FIG. 3, more specifically, FIGS. 3(A) and (B) represent a timing of reception and a timing of transmission, respectively, when users 1 and 2 have path division multiple connection to a single time slot.

With reference to FIG. 3(A), if a timing of arrival (a synchronization position) of user 1 approaches a synchronization position of user 2, as indicated by a thick, rightward arrow, and users 1 and 2 have their respective synchronization windows with a small interval therebetween, there is a possibility that the synchronization windows may overlap. To prevent this, as shown in FIG. 3(B), a timing of transmission for user 1 is controlled to be earlier, as indicated by a thick, leftward arrow.

That is, if a radio base station system provides a transmission at an earlier timing, a mobile terminal device having received the transmission also provides a transmission at an earlier timing and consequently the radio base station system also receives the transmission at an earlier timing.

Thus, by controlling a timing of transmission for user 1 to be earlier, a timing of reception from user 1 can reflectively be earlier to prevent a synchronization window of user 1 from approaching that of user 2. A similar effect can also be obtained by delaying a timing of transmission for user 2.

In other words, if users 1 and 2 have their respective synchronization windows approaching each other, one or both of the timings of transmission for users 1 and 2 is/are controlled to increase a difference in time between the timings of transmission for users 1 and 2.

With reference to FIG. 3(A) if a timing of arrival (a synchronization position) of user 1 moves away from a synchronization position of user 2, as indicated by a thick leftward arrow, and users 1 and 2 thus have their respective windows spaced apart, there is a possibility that the windows may not be accommodated in a single slot. To prevent this, as shown in FIG. 3(B), a timing of transmission for user 1 is controlled to be delayed, as indicated by a thick rightward arrow.

That is, if the radio base station system provides a transmission at a delayed timing, a mobile terminal device having received the transmission also provides a transmission at a delayed timing and consequently the radio base station system receives the transmission at a delayed timing.

Thus, by controlling a timing of transmission for user 1 to be delayed, a timing of reception from user 1 can reflectively be delayed to prevent the synchronization window of user 1 from being distant from that of user 2 more than required. A similar effect can also be obtained by timing a transmission for user 2 earlier.

In other words, if users 1 and 2 have their respective synchronization windows distant from each other, one or both of the timings of transmission for users 1 and 2 is/are controlled to reduce the difference in time between the timings of transmission for users 1 and 2.

The FIG. 3 synchronization window control is effected by the FIG. 1 DSP 14 at synchronization window control unit 15b and transmission timing adjustment unit 16d. In effect, the process is provided by DSP 14 in software and a variety of embodiments of the present invention will now be described with reference to the flow charts corresponding thereto.

First Embodiment

Figure 4:
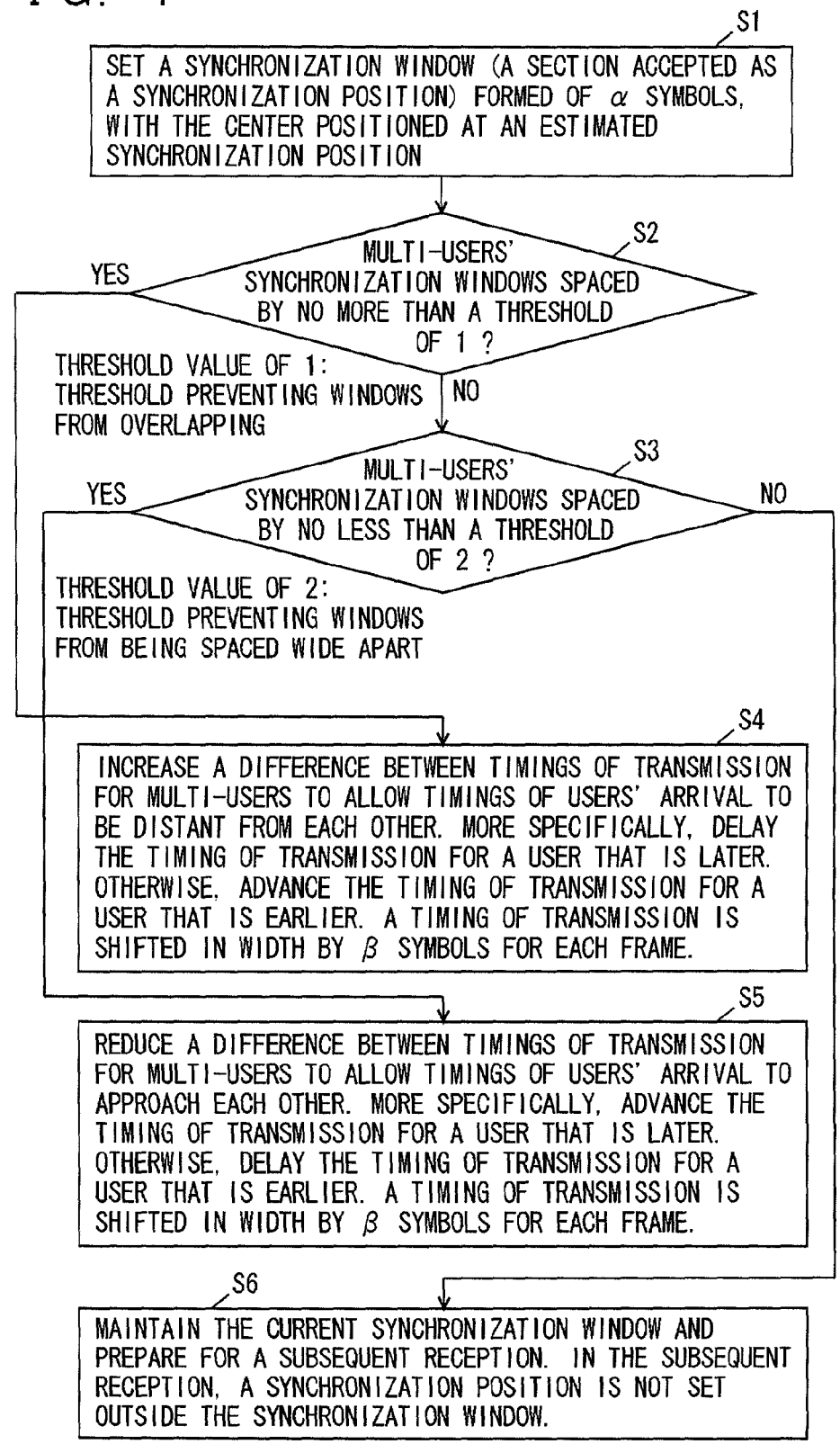
FIGS. 4–8 are flow charts of synchronization window control processes in first to fifth embodiments, respectively, of the present invention.

FIG. 4 is a flow chart of a synchronization window control process in a first embodiment of the present invention, representing a most basic process having been described with reference to FIG. 3.

With reference to FIG. 4, initially at step S1 a synchronization window of α symbols in length is set with its center positioned at a synchronization position estimated by a well-known method.

Then at step S2 it is determined whether users having path division multiple connection have their respective synchronization windows spaced by no more than a value of one corresponding to a predetermined threshold value set to prevent synchronization windows from overlapping.

If the synchronization windows are spaced by no more than the predetermined threshold value of one then the process moves on to step S4 and, as has been described with reference to FIG. 3, a process is effected to increase the difference between the timings of transmissions for the users, respectively. Note that a timing of transmission is shifted in width by β symbols at a time for each frame.

If at step S2 it is determined that the synchronization windows are not spaced by no more than the threshold of one, then at step S3 it is determined whether the users have their respective synchronization windows spaced by no less than a value of two corresponding to a predetermined threshold value set to prevent synchronization windows from being too distant from each other.

If the synchronization windows are spaced by no less than the predetermined threshold value of two then the process moves on to step S5 and, as has been described with reference to FIG. 3, a process is effected to reduce the difference between the timings of transmissions for the users. Note that a timing of transmission is shifted in width by β symbols at a time for each frame.

If at step S3 it is determined that the synchronization windows are not spaced by no less than the threshold value of two then the process moves on to step S6 and it maintains the synchronization window currently set and prepares for reception in the subsequent frame. At the subsequent timing of reception the control does not accept any synchronization position external to the range of the currently set synchronization window.

Thus in the first embodiment a synchronization window can be set with its center positioned at a synchronization position of a signal from each user's mobile terminal device having multiple connection, to eliminate a signal received outside the synchronization window and in a single slot multiple users can have their respective synchronization windows having therebetween an interval maintained as appropriate by controlling the timings of signal transmission for the multiple users to prevent the users from having their respective synchronization positions approaching each other or existing outside the time slot of interest.

Second Embodiment

Figure 5:
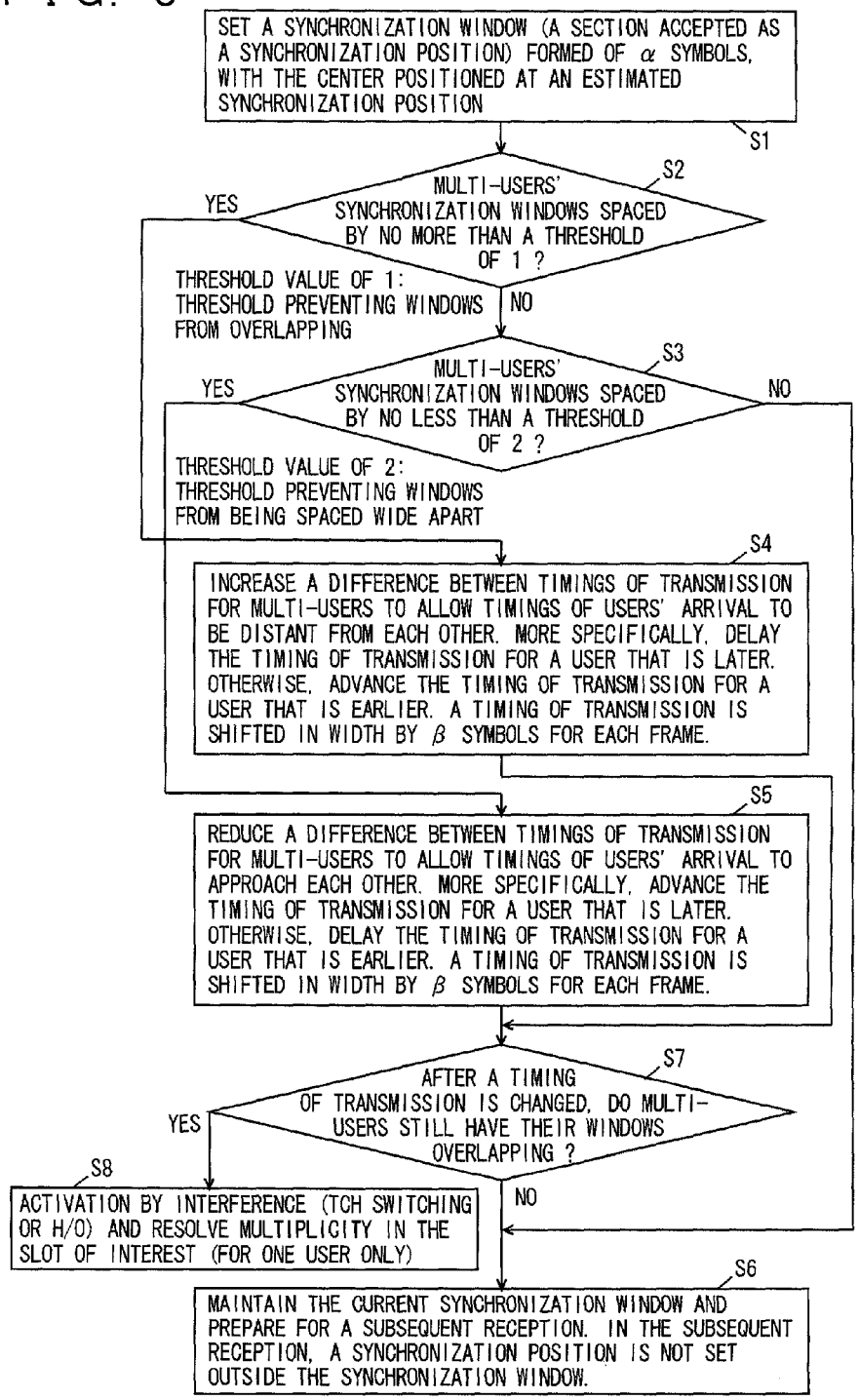

FIG. 5 is a flow chart of a synchronization window control process in a second embodiment of the present invention. In the second embodiment, steps S1–S6 are identical to those of the first embodiment as shown in FIG. 4.

The second embodiment is distinguished from the first embodiment as follows. If timings of reception for users having path division multiple connection rapidly approach each other and the aforementioned step S4 of increasing the difference between timings of transmission is not effected in time, the synchronization windows may overlap. If such a condition is not resolved, the synchronization positions can approach each other or have an inverted time relationship therebetween.

In the second embodiment it is determined at step S7 whether synchronization windows overlap, as described above, after the transmission timing is controlled, and if so then the process moves on to step S8 to introduce a so-called activation by interference operation to cancel a multiple connection of the users having their synchronization windows overlapping in the time slot of interest.

A path division multiple connection is canceled by such specific methods as TCH switching, hand-over (H/O) and other similar techniques. The TCH switching cancels a multiple connection by shifting one of multiple-connected users having their synchronization windows overlapping in a time slot to another time slot. The H/O cancels a multiple connection by shifting such one user that cannot be connected to such another time slot to a time slot of a different base station.

Thus in the second embodiment when a timing of transmission is controlled and synchronization windows still overlap a path division multiple connection in the time slot of interest can be canceled at least partially (between users having their synchronization windows overlapping) to prevent the users from having their synchronization positions approaching each other or having an inverted time relationship therebetween.

Third Embodiment

Figure 6:
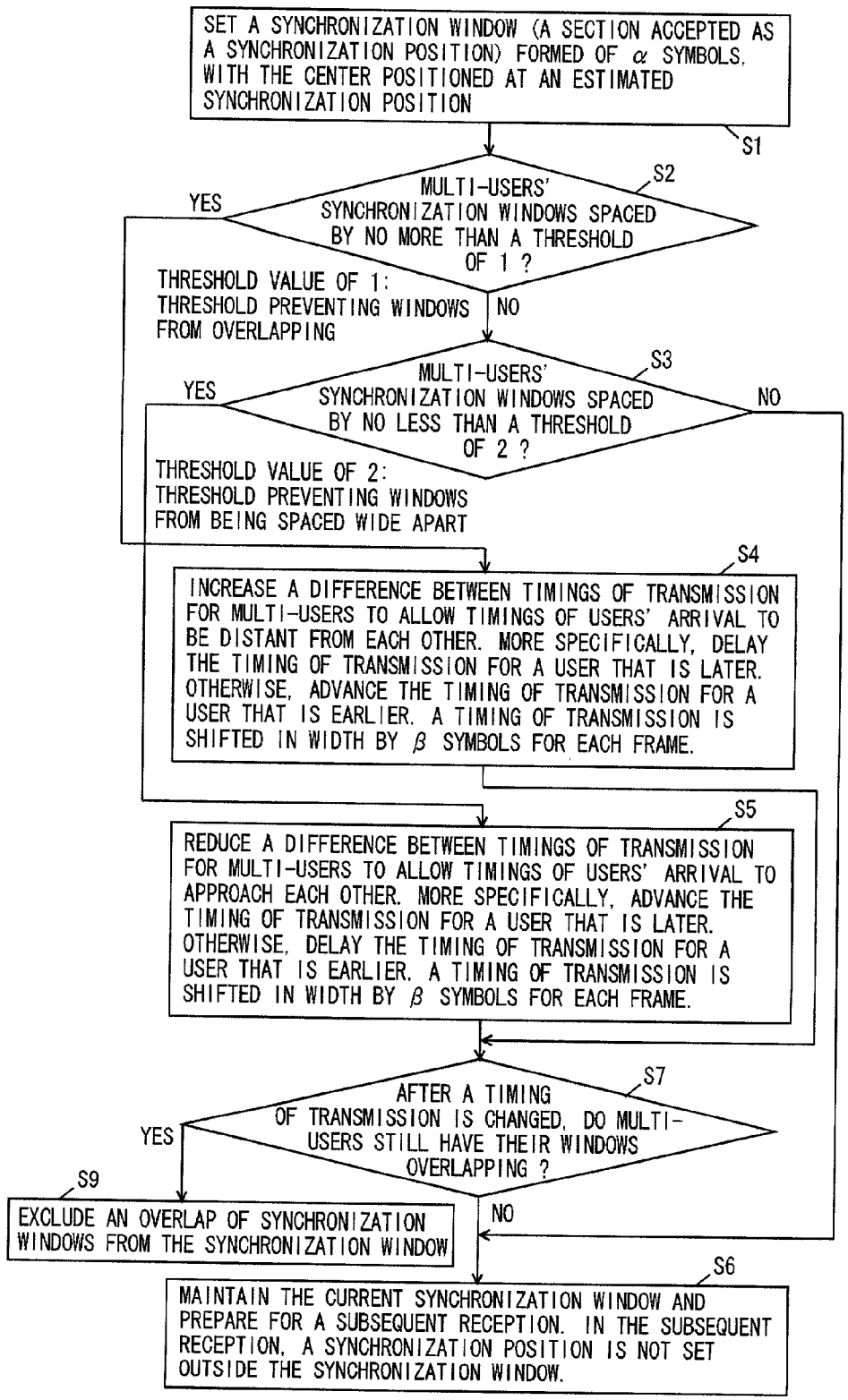

FIG. 6 is a flow chart of a synchronization window control process in a third embodiment of the present invention. The third embodiment is identical to the second embodiment as shown in FIG. 5, except the following feature.

More specifically, if a timing of transmission has been controlled and it is determined at step S7 that synchronization windows still overlap then the control in the present embodiment provides at step S9 a process to exclude the synchronization windows' overlapping portion from the synchronization window. In other words, if a timing of reception arrives in a subsequent reception frame at an overlap of synchronization windows, it is not regarded as a synchronization position.

Thus in the third embodiment if a timing of transmission has been controlled and synchronization windows still overlap any subsequent timing of reception in the overlap of the synchronization windows can be excluded to prevent users from having their synchronization positions approaching each other or having an inverted time relationship therebetween.

Fourth Embodiment

Figure 7:
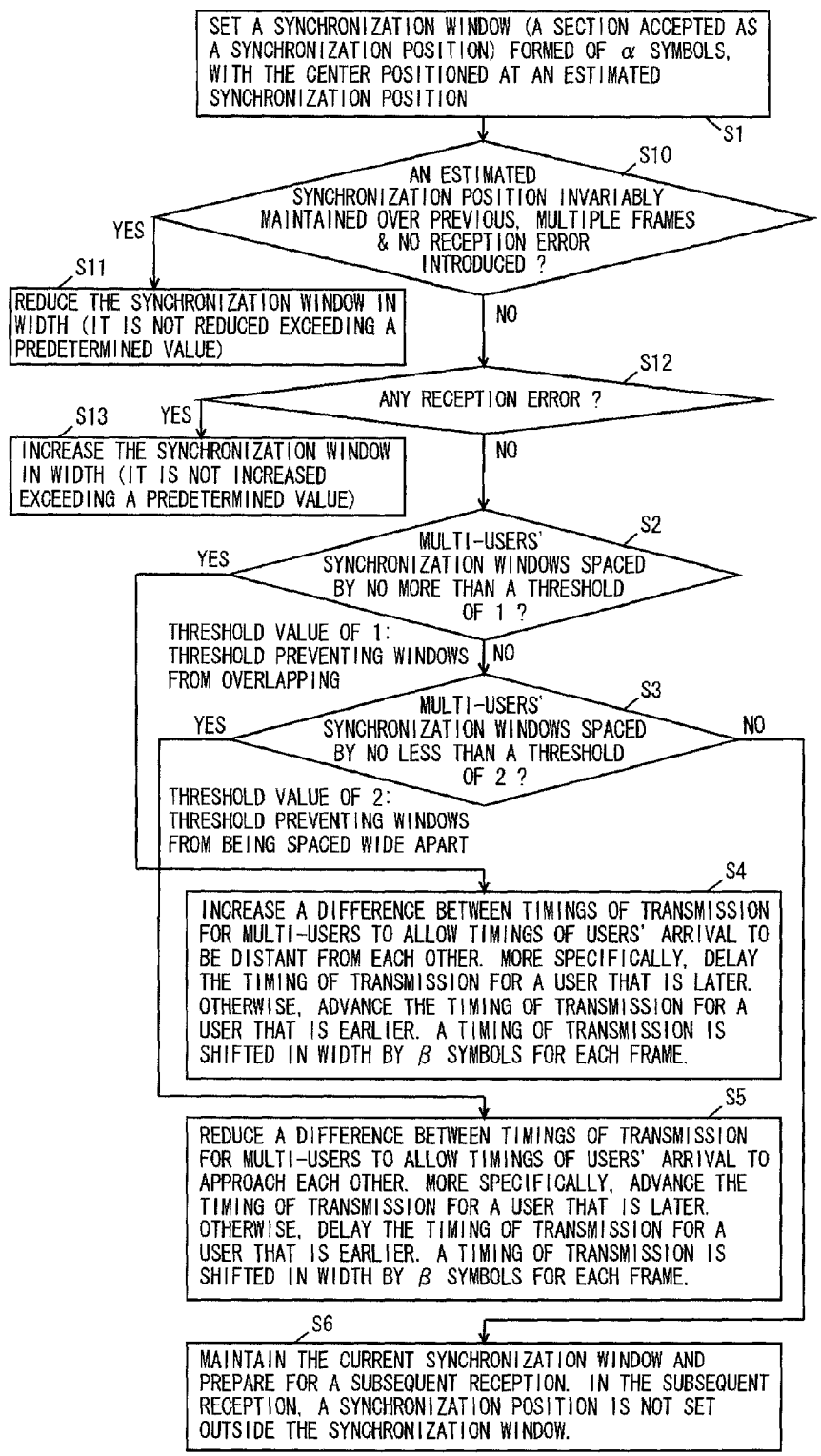

FIG. 7 is a flow chart representing a synchronization window control process in a fourth embodiment of the present invention. In the present embodiment, steps S1–S6 are identical to those of the first embodiment shown in FIG. 4.

The present embodiment is distinguished from the first embodiment as follows. If at step S10 it is determined that a user have a timing of reception that is constant over a plurality of previous frames and the user is also free of any reception error, it is hardly expected that the user's synchronization position would significantly vary and at step S11 the process reduces the user's synchronization window in width. Note however that the reduction does not exceed a predetermined width. As such, synchronization windows less likely to overlap.

If with a synchronization window thus reduced in width it is determined at step S12 that in a subsequent frame a signal from the user of interest includes a reception error, then at step S13 the control increases the width of the synchronization window of the user to the initial width thereof. It should be noted, however, that the window is not increased to exceed its initial width. Thus, if a reception error is introduced and a radio wave is received in an unstable state the synchronization window of interest can be increased in width to increase a tolerable range accepting a synchronization position to ensure that a varying timing of reception is not missed.

Note that a reception error herein is introduced when a desired wave cannot be extracted accurately through the adaptive array process for example because of an effect of a direction of arrival of an interference wave on a direction of arrival of a desired wave from a desired user, a difference in received power between a desired wave and an interference wave, or any other similar factors. Representative reception errors include cyclic redundancy check (CRC) error, unique word (UW) error and the like. They are detected in a well-known method, as specifically disclosed for example in Standard 28, a specification of the PHS, and thus not be described herein.

Furthermore, if a synchronization window is decreased or increased in width, it is decreased to a predetermined value or increased to its initial width at one time or gradually for each frames.

Thus in the fourth embodiment a synchronization window is controlled in width with a condition of signal reception taken into account. Thus, synchronization windows can be less likely to overlap and users can thus be prevented from having their synchronization positions approaching each other or having an inverted time relationship therebetween.

Fifth Embodiment

Figure 8:
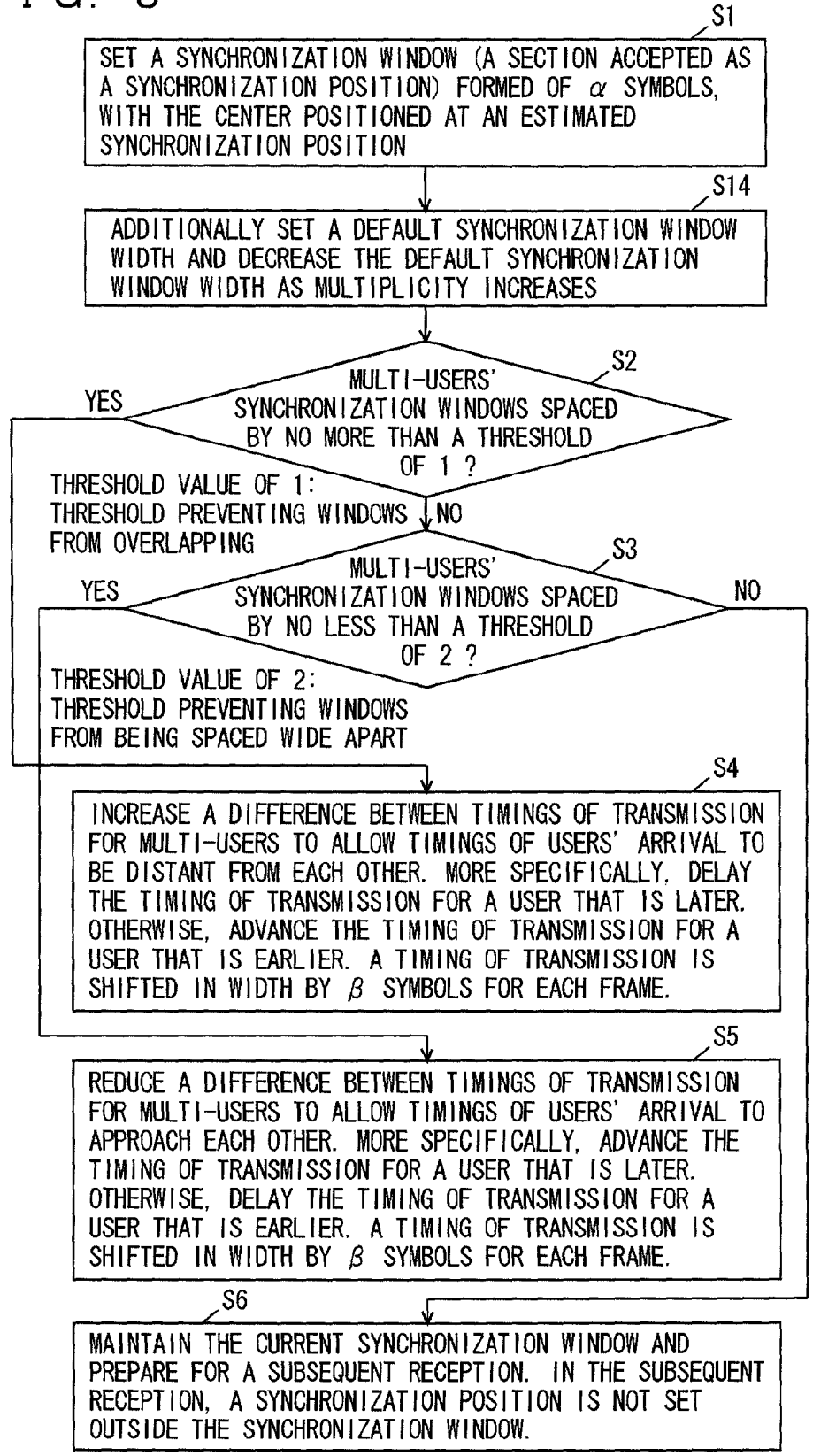

FIG. 8 is a flow chart representing a synchronization window control process in a fifth embodiment of the present invention. In the present embodiment, steps S1–S6 are identical to those of the first embodiment as shown in FIG. 4.

The present embodiment is distinguished from the first embodiment, as follows. At step S14 a default synchronization window width is newly set and if the number of users having path division multiple connection to the time slot of interest is increased, i.e., if multiplicity is increased, each user's default synchronization window width is reduced.

If the number of users having path division multiple connection to a single time slot is increased, the users of course have their respective synchronization windows approaching each other, which results in an increased possibility that the synchronization windows will overlap.

Accordingly in the present embodiment synchronization windows are reduced in width as multiplicity increases. This reduces the possibility that synchronization windows overlap and thus prevents synchronization positions from approaching each other or having an inverted time relationship therebetween.

Thus in the present invention a radio base station system can provide a synchronization window set with its center positioned at a synchronization position of a signal from a mobile terminal device of each user to exclude a signal received outside the synchronization window and in a single slot multiple users can have their respective synchronization windows having therebetween an interval maintained as appropriate by controlling the timings of signal transmission for the multiple users to prevent the users from having their respective synchronization positions approaching each other or having an inverted time relationship therebetween and thus prevent impaired speech characteristics and inter-user interference.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A radio base station system permitting path division multiple connection of a plurality of mobile terminal devices, comprising:
 a synchronization window setting unit setting a synchronization window having a predetermined temporal length with a center positioned at a timing of reception of a signal transmitted from each mobile terminal device;
 a reception disallowing unit disallowing subsequent reception of said signal if a timing of said subsequent reception of said signal is external to said set synchronization window; and
 a transmission timing control unit controlling timings of signal transmission for respective ones of said plurality of mobile terminal devices having path division multiple connection to a specific time slot, to allow said plurality of mobile terminal devices to have their respective synchronization windows spaced from each other, as appropriate, within said specific time slot.

2. The system of claim 1, wherein said transmission timing control unit includes:
 a first control unit controlling said timings of signal transmission to increase a difference in time between said timings of signal transmission for respective ones of said plurality of mobile terminal devices having said path division multiple connection, when said plurality of mobile terminal devices have their respective synchronization windows with a reduced interval therebetween; and
 a second control unit controlling said timings of signal transmission to decrease a difference in time between said timings of signal transmission for respective ones of said plurality of mobile terminal devices having said path division multiple connection, when said plurality of mobile terminal devices have their respective synchronization windows with an increased interval therebetween.

3. The system of claim 1, wherein said transmission timing control unit includes a third control unit at least partially canceling said path division multiple connection to said specific time slot when at least two said mobile terminal devices having said path division multiple connection have their respective synchronization windows overlapping, after said transmission timing control unit controls said timings of transmission.

4. The system of claim 3, wherein said third control unit includes a first connection unit connecting to a different time slot of the radio base station system any of said plurality of mobile terminal devices having said path division multiple connection.

5. The system of claim 3, wherein said third control unit includes a second connection unit connecting to a time slot of a different radio base station system any of said plurality of mobile terminal devices having said path division multiple connection.

6. The system of claim 1, wherein said transmission timing control unit includes a fourth control unit excluding from said synchronization window of each of at least two said mobile terminal devices having said path division multiple connection an overlap of said at least two synchronization windows when said at least two mobile terminal devices have their respective synchronization windows overlapping, after said transmission timing control unit controls said timings of transmission.

7. The system of claim 1, further comprising a synchronization window width control unit controlling widths of said synchronization windows of respective ones of said plurality of mobile terminal devices having said path division multiple connection to said specific time slot, to allow said synchronization windows to be spaced from each other, as appropriate, within said specific time slot.

8. The system of claim 7, wherein said synchronization window width control unit includes a fifth control unit reducing a width of said synchronization window of said mobile terminal device transmitting a signal received at a timing constant over a predetermined period of time.

9. The system of claim 8, wherein said synchronization window control unit includes a sixth control unit increasing a width of said synchronization window when a reception error is introduced with said mobile terminal device having the width of said synchronization window reduced.

10. The system of claim 7, wherein said synchronization window width control unit includes a seventh control unit reducing widths of said synchronization windows of respective ones of said mobile terminal devices having said path division multiple connection to said specific time slot, if a number of said mobile terminal devices having said path division multiple connection to said specific time slot is increased.

11. A method of controlling a synchronization window in a radio base station system permitting path division multiple connection of a plurality of mobile terminal devices, comprising the steps of:
setting a synchronization window having a predetermined temporal length with a center positioned at a timing of reception of a signal transmitted from each mobile terminal device;
disallowing subsequent reception of said signal if a timing of said subsequent reception of said signal is external to said set synchronization window; and
controlling timings of signal transmission for respective ones of said plurality of mobile terminal devices having path division multiple connection to a specific time slot, to allow said plurality of mobile terminal devices to have their respective synchronization windows spaced from each other, as appropriate, within said specific time slot.

12. The method of claim 11, wherein the step of controlling includes the steps of:
controlling said timings of signal transmission to increase a difference in time between said timings of signal transmission for respective ones of said plurality of mobile terminal devices having said path division multiple connection, when said plurality of mobile terminal devices have their respective synchronization windows with a reduced interval therebetween; and
controlling said timings of signal transmission to decrease a difference in time between said timings of signal transmission for respective ones of said plurality of mobile terminal devices having said path division multiple connection, when said plurality of mobile terminal devices have their respective synchronization windows with an increased interval therebetween.

13. The method of claim 11, wherein the step of controlling includes the step of at least partially canceling said path division multiple connection to said specific time slot when at least two said mobile terminal devices having said path division multiple connection have their respective synchronization windows overlapping, after said step of controlling said timings of transmission.

14. The method of claim 13, wherein the step of canceling said path division multiple connection includes the step of connecting to a different time slot of the radio base station system any of said plurality of mobile terminal devices having said path division multiple connection.

15. The method of claim 13, wherein the step of canceling said path division multiple connection includes the step of connecting to a time slot of a different radio base station system any of said plurality of mobile terminal devices having said path division multiple connection.

16. The method of claim 11, wherein the step of controlling includes the step of excluding from said synchronization window of each of at least two said mobile terminal devices having said path division multiple connection an overlap of said at least two synchronization windows when said at least two mobile terminal devices have their respective synchronization windows overlapping, after the step of controlling said timings of transmission.

17. The method of claim 11, further comprising the step of controlling widths of said synchronization windows of respective ones of said plurality of mobile terminal devices having said path division multiple connection to said specific time slot, to allow said synchronization windows to be spaced from each other, as appropriate, within said specific time slot.

18. The method of claim 17, wherein the step of controlling the widths includes the step of reducing a width of said synchronization window of said mobile terminal device transmitting a signal received at a timing constant over a predetermined period of time.

19. The method of claim 18, wherein the step of controlling the widths includes the step of increasing a width of said synchronization window when a reception error is introduced with said mobile terminal device having the width of said synchronization window reduced.

20. The method of claim 17, wherein the step of controlling the widths includes the step of reducing widths of said synchronization windows of respective ones of said mobile terminal devices having said path division multiple connection to said specific time slot, if a number of said mobile terminal devices having said path division multiple connection to said specific time slot is increased.

21. A program used to control a synchronization window in a radio base station system permitting path division multiple connection of a plurality of mobile terminal devices, the program causing a computer to execute the steps of:
setting a synchronization window having a predetermined temporal length with a center positioned at a timing of reception of a signal transmitted from each mobile terminal device;
disallowing subsequent reception of said signal if a timing of said subsequent reception of said signal is external to said set synchronization window; and
controlling timings of signal transmission for respective ones of said plurality of mobile terminal devices having path division multiple connection to a specific time slot, to allow said plurality of mobile terminal devices to have their respective synchronization windows spaced from each other, as appropriate, within said specific time slot.

22. The program of claim 21, wherein the step of controlling includes the steps of:

controlling said timings of signal transmission to increase a difference in time between said timings of signal transmission for respective ones of said plurality of mobile terminal devices having said path division multiple connection, when said plurality of mobile terminal devices have their respective synchronization windows with a reduced interval therebetween; and controlling said timings of signal transmission to decrease a difference in time between said timings of signal transmission for respective ones of said plurality of mobile terminal devices having said path division multiple connection, when said plurality of mobile terminal devices have their respective synchronization windows with an increased interval therebetween.

23. The program of claim 21, wherein the step of controlling includes the step of at least partially canceling said path division multiple connection to said specific time slot when at least two said mobile terminal devices having said path division multiple connection have their respective synchronization windows overlapping, after said step of controlling said timings of transmission.

24. The program of claim 23, wherein the step of canceling said path division multiple connection includes the step of connecting to a different time slot of the radio base station system any of said plurality of mobile terminal devices having said path division multiple connection.

25. The program of claim 23, wherein the step of canceling said path division multiple connection includes the step of connecting to a time slot of a different radio base station system any of said plurality of mobile terminal devices having said path division multiple connection.

26. The program of claim 21, wherein the step of controlling includes the step of excluding from said synchronization window of each of at least two said mobile terminal devices having said path division multiple connection an overlap of said at least two synchronization windows when said at least two mobile terminal devices have their respective synchronization windows overlapping, after the step of controlling said timings of transmission.

27. The program of claim 21, further causing the computer to execute the step of controlling widths of said synchronization windows of respective ones of said plurality of mobile terminal devices having said path division multiple connection to said specific time slot, to allow said synchronization windows to be spaced from each other, as appropriate, within said specific time slot.

28. The program of claim 27, wherein the step of controlling the widths includes the step of reducing a width of said synchronization window of said mobile terminal device transmitting a signal received at a timing constant over a predetermined period of time.

29. The program of claim 28, wherein the step of controlling the widths includes the step of increasing a width of said synchronization window when a reception error is introduced with said mobile terminal device having the width of said synchronization window reduced.

30. The program of claim 27, wherein the step of controlling the widths includes the step of reducing widths of said synchronization windows of respective ones of said mobile terminal devices having said path division multiple connection to said specific time slot, if a number of said mobile terminal devices having said path division multiple connection to said specific time slot is increased.

* * * * *